Patented Aug. 20, 1929.

1,724,909

UNITED STATES PATENT OFFICE.

ROBERT M. CRAWFORD, OF ASPINWALL, PENNSYLVANIA.

METHOD OF DESULPHURIZING GAS.

No Drawing. Application filed July 3, 1926, Serial No. 120,529. Renewed January 23, 1929.

It has heretofore been proposed to decompose alkali metal phenolates by the use of acid salts of an alkali metal, such, for example, as sodium bicarbonate. The sodium bicarbonate is preferably made into a thin paste with water and added to the alkali metal phenolate solution in sufficient amounts to satisfy the reaction equation for the formation of alkali metal carbonates and separation of the phenols. The sodium bicarbonate is utilized as a convenient source of carbon dioxide which is the active agent in converting the sodium phenolate into sodium carbonate containing some phenolic bodies or phenolates.

In said method alkali metal carbonate is formed as a byproduct.

Also in the carbon dioxide gas method of decomposing said phenolates the alkali metal carbonates are formed as a byproduct.

I have discovered that the sodium carbonate formed in decomposition of such alkali metal phenolates has especial advantages in the desulphurizing of gas. This is probably due to some type of "activation" and I have not found the exact reason therefor. Probably the presence of small quantities of phenols or undecomposed alkali phenolates in the byproduct sodium carbonate or other alkali metal carbonate solutions functions to activate the solutions and make them more efficient for the removal of hydrogen sulphide from the gas.

In United States Patents Nos. 1,389,980 and 1,436,196 are described processes for the desulphurizing of gas by a water solution of sodium carbonate. In such process a solution of sodium carbonate is used to wash the gas in a scrubbing tower and then in a similar tower somewhat larger the fouled solution is "actified" by air blown rapidly through the liquid from the bottom. The revivified solution is then returned for use in the first tower. The solution is preferably of a strength of about 30 grams per liter. If the solution is properly activated and the size of the apparatus is suitable for securing proper flow ratios the reduction of the hydrogen sulphide will average about 85%.

I have found that the byproduct sodium carbonate solution, or other alkali metal carbonate solutions, formed in the decomposition of phenolates, can be used in the above described process, or similar processes, to better advantage than ordinary sodium carbonate. By its use the reduction of hydrogen sulphide in the gas will average 90% to 95% in such processes.

Changes may be made in the process of using the "activated" byproduct alkali metal carbonate, the apparatus may be varied, the process of decomposing the phenolates to obtain the alkali metal carbonate may be changed, and other changes may be made without departing from my invention.

I claim:

1. In the desulphurizing of gas by alkali metal carbonate, the step consisting of washing the gas with a solution containing an alkali metal carbonate obtained from decomposition of phenolates.

2. In the desulphurizing of gas by sodium carbonate, the step consisting of washing the gas with a solution containing sodium carbonate obtained from decomposition of phenolates.

3. In the desulphurizing of gas, the step consisting of treating the gas with a solution of sodium carbonate obtained by neutralizing alkali metal phenolates with sodium bicarbonate.

4. In the desulphurizing of gas, the step consisting of treating the gas with a solution of alkali metal carbonate obtained by neutralizing alkali metal phenolates with an acid salt of an alkali metal.

5. In the desulphurizing of gas, the step consisting of treating the gas with a solution containing an alkali metal carbonate obtained by neutralizing phenolates with carbon dioxide.

6. In the desulphurizing of gas, the step consisting of treating the gas with a solution containing an alkali metal carbonate obtained by neutralizing phenolates with substances yielding carbon dioxide.

7. The process of removing hydrogen sulphide from gas, which comprises scrubbing the gas with a water solution containing alkali metal carbonate and phenolic bodies obtained by the carbon dioxide decomposition of an alkali metal phenolate.

8. The process of removing hydrogen sulphide from gas, which comprises converting a sodium phenolate into sodium carbonate accompanied by phenolic bodies, and scrubbing the gas with a water solution containing the sodium carbonate and phenolic bodies so obtained.

In testimony whereof I have hereunto set my hand

ROBERT M. CRAWFORD.